(12) United States Patent
Sasaki

(10) Patent No.: US 12,348,696 B2
(45) Date of Patent: Jul. 1, 2025

(54) IMAGE FORMING APPARATUS AND MAIL TRANSMISSION AND RECEPTION CONTROL METHOD FOR AN IMAGE FORMING APPARATUS

(71) Applicant: TOSHIBA TEC KABUSHIKI KAISHA, Tokyo (JP)

(72) Inventor: Takahiro Sasaki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 221 days.

(21) Appl. No.: 18/074,170

(22) Filed: Dec. 2, 2022

(65) Prior Publication Data
US 2023/0308592 A1   Sep. 28, 2023

(30) Foreign Application Priority Data

Mar. 23, 2022   (JP) ................................ 2022-046735

(51) Int. Cl.
| | | |
|---|---|---|
| *H04L 29/06* | (2006.01) | |
| *H04L 9/40* | (2022.01) | |
| *H04N 1/00* | (2006.01) | |
| *H04N 1/44* | (2006.01) | |

(52) U.S. Cl.
CPC ....... *H04N 1/4433* (2013.01); *H04L 63/0807* (2013.01); *H04N 1/00209* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,397,362 B2 | 7/2008 | Zhang et al. | |
| 9,454,577 B1* | 9/2016 | Kapoor | G06Q 30/04 |
| 10,382,269 B2* | 8/2019 | Haapanen | H04L 63/08 |
| 10,831,417 B1* | 11/2020 | Su | G06N 20/00 |
| 11,030,496 B1* | 6/2021 | Mostafa | G06K 15/1814 |
| 2006/0077422 A1* | 4/2006 | Mathieson | H04N 1/00204 358/1.15 |

(Continued)

FOREIGN PATENT DOCUMENTS

| | | |
|---|---|---|
| JP | 2009-005209 A | 1/2009 |
| JP | 2011-192061 A | 9/2011 |
| JP | 2015-069244 A | 4/2015 |

OTHER PUBLICATIONS

Liyanage, Geethapriya; Fernando, Shantha. A comprehensive secure email transfer model. 2017 IEEE International Conference on Industrial and Information Systems (ICIIS). https://ieeexplore.ieee.org/stamp/stamp.jsp?tp=&arnumber=8300341 (Year: 2017).*

(Continued)

*Primary Examiner* — Jeremiah L Avery
(74) *Attorney, Agent, or Firm* — Kim & Stewart LLP

(57) ABSTRACT

According to an embodiment, an image forming apparatus forms an image on paper on the basis of image data. A processor of the image forming apparatus performs authentication and authorization with an authorization server to acquire a token and then stores the token in a storage device. When transmitting and receiving an e-mail, the processor of the image forming apparatus transmits and receives an e-mail to and from a mail server by using the token read from the storage device.

8 Claims, 3 Drawing Sheets

(56) References Cited

U.S. PATENT DOCUMENTS

| | | | |
|---|---|---|---|
| 2007/0091010 A1* | 4/2007 | Richardson | H04L 67/02 345/2.1 |
| 2007/0146823 A1* | 6/2007 | Borchers | H04N 1/00244 358/496 |
| 2007/0147610 A1* | 6/2007 | Kethi Reddy | H04N 1/32128 380/229 |
| 2011/0096174 A1* | 4/2011 | King | H04N 1/00244 348/207.1 |
| 2011/0317218 A1* | 12/2011 | Zhang | H04N 1/00244 358/1.15 |
| 2013/0063773 A1* | 3/2013 | Bae | G06Q 10/107 358/1.15 |
| 2014/0253933 A1* | 9/2014 | Selvaraj | G06F 3/04847 358/1.15 |
| 2014/0254795 A1* | 9/2014 | Selvaraj | H04N 1/00204 380/246 |
| 2015/0092233 A1* | 4/2015 | Park | H04N 1/00244 358/1.15 |
| 2015/0103383 A1* | 4/2015 | Dowling | H04N 1/00225 358/402 |
| 2015/0215481 A1* | 7/2015 | Faust | H04N 1/32122 358/1.13 |
| 2016/0224983 A1* | 8/2016 | Cash | H04L 63/0861 |
| 2016/0283168 A1* | 9/2016 | Osadchyy | G06F 3/1253 |
| 2017/0048416 A1* | 2/2017 | Cho | G06F 3/1292 |
| 2018/0032286 A1* | 2/2018 | Panda | G06F 3/1288 |
| 2018/0032496 A1* | 2/2018 | Panda | G06F 40/226 |
| 2018/0249037 A1* | 8/2018 | Shono | H04N 1/32149 |
| 2019/0034127 A1* | 1/2019 | Chhabra | G06F 3/1288 |
| 2019/0081943 A1* | 3/2019 | Yamanakajima | H04L 63/083 |
| 2019/0149539 A1* | 5/2019 | Scruby | H04L 63/083 713/168 |
| 2019/0394187 A1* | 12/2019 | Fletcher | H04L 9/3247 |
| 2020/0267103 A1* | 8/2020 | Hannikainen | H04L 63/1441 |
| 2021/0303944 A1* | 9/2021 | Mostafa | G06F 3/1204 |
| 2022/0078007 A1* | 3/2022 | Reddem | H04L 63/0815 |
| 2022/0092347 A1* | 3/2022 | Su | G06F 18/24133 |
| 2022/0224680 A1* | 7/2022 | Goswami | H04L 67/01 |
| 2022/0240093 A1* | 7/2022 | Bora | H04B 17/318 |
| 2022/0272084 A1* | 8/2022 | Hyatt | H04W 12/40 |
| 2022/0394039 A1* | 12/2022 | Deodurg | H04L 63/102 |

OTHER PUBLICATIONS

Sun, Bo et al. Leveraging Machine Learning Techniques to Identify Deceptive Decoy Documents Associated With Targeted Email Attacks. IEEE Access, vol. 9. https://ieeexplore.ieee.org/stamp/stamp.jsp?tp=&arnumber=9435284 (Year: 2021).*

* cited by examiner

IMAGE FORMING APPARATUS AND MAIL TRANSMISSION AND RECEPTION CONTROL METHOD FOR AN IMAGE FORMING APPARATUS

CROSS-REFERENCE TO RELATED APPLICATIONS

This application is based upon and claims the benefit of priority from the prior Japanese Patent Application No. 2022-046735, filed on Mar. 23, 2022, the entire contents of which are incorporated herein by reference.

FIELD

An Embodiment described herein generally relates to an image forming apparatus and a mail transmission and reception control method for the image forming apparatus.

BACKGROUND

There is known an image forming apparatus having a function of transmitting and receiving e-mails via an e-mail server that operates in a cloud service.

In recent years, in order to improve security, a technique in which authorization processing is performed using a token in connecting to a cloud service to eliminate an unauthorized connection has been used.

DETAILED DESCRIPTION

Figure 1:
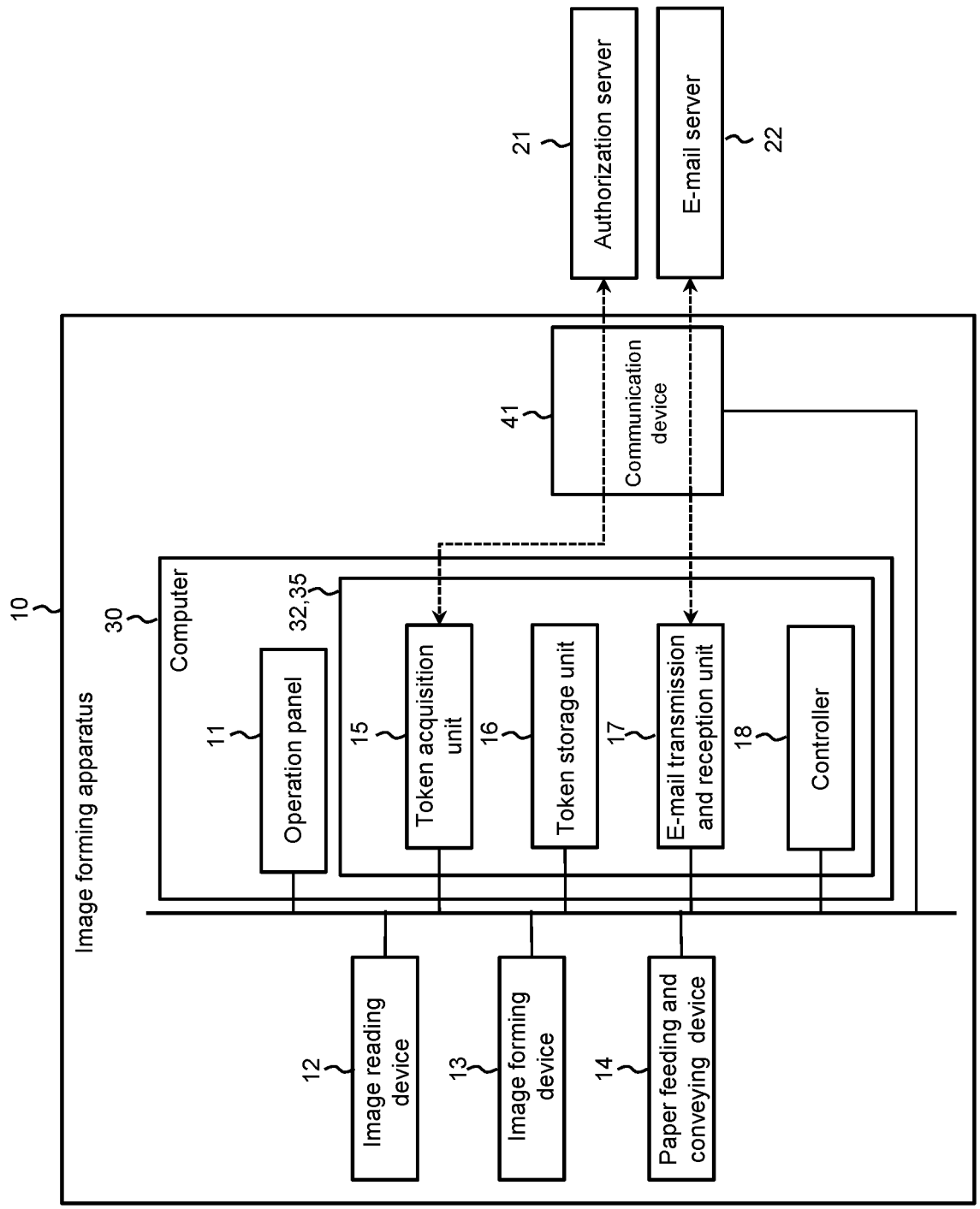
FIG. 1 is a block diagram showing an exemplary functional configuration of an image forming apparatus according to an embodiment.

According to one embodiment, an image forming apparatus is capable of communicating externally. The image forming apparatus includes an image forming device, a storage device, a memory, and a processor. The image forming device forms an image on paper on the basis of image data. The storage device stores a token issued by an external authorization server. The memory stores an application program for acquiring the token and transmitting and receiving an e-mail. The processor executes the application program stored in the memory. The processor performs, by executing the application program, authentication and authorization with the authorization server to acquire the token issued by the authorization server. Further, the processor stores the acquired token in the storage device. Further, the processor acquires, when an e-mail is transmitted and received, the token stored in the storage device to transmit and receive the e-mail to and from a mail server by using the acquired token.

Hereinafter, an image forming apparatus, a control method therefor, and the like according to an embodiment will further be described with reference to the drawings. The same reference symbols in the drawings will denote the same or similar portions.

Functional Configuration

A functional configuration of an image forming apparatus according to an embodiment will be described with reference to FIG. 1. FIG. 1 is a block diagram showing an example of an overall configuration of an image forming apparatus 10 and a functional configuration of a computer 30 of the image forming apparatus 10 according to the embodiment.

The image forming apparatus 10 is, for example, a multifunction machine or a multifunction peripheral (MFP), and has a plurality of functions such as a print function, a scan function, and a copy function.

Specifically, as shown in FIG. 1, the image forming apparatus 10 incorporates the computer 30. Further, the image forming apparatus 10 includes an operation panel 11 included in the computer 30, an image reading device 12, an image forming device 13, a paper feeding and conveying device 14, and a communication device 41. Details of the computer 30 will be described later.

The operation panel 11 displays information for a user to operate the image forming apparatus 10, and receives an instruction from the user. For example, the operation panel 11 includes a touch panel and displays operation buttons of icons on the touch panel. Alternatively, the operation panel 11 includes operation buttons of push buttons.

The image reading device 12 reads an image recorded on a document or the like using a sensor such as a contact image sensor (CIS) or a charge coupled device (CCD), and generates image data.

The image forming device 13 forms an image using toner on paper conveyed by the paper feeding and conveying device 14 on the basis of the image data generated by the image reading device 12 or the image data received from an external device (not shown) via the communication device 41. Thus, the image forming device 13 includes a photoreceptor unit, a toner unit, and the like.

The paper feeding and conveying device 14 takes out paper from a paper feed cassette for storing paper, and conveys the paper to the image forming device 13. Moreover, the paper feeding and conveying device 14 conveys the paper, on which the image is formed by the image forming device 13, to a paper feed tray. The communication device 41 communicates with the outside. For example, the communication device 41 communicates with an external authorization server 21 in order to acquire a token to be described later. Further, for example, the communication device 41 communicates with an external e-mail server 22 in order to transmit and receive an electronic mail (hereinafter, referred to as e-mail) to be described later. Further, for example, the communication device 41 communicates with an external device in order to acquire the above-mentioned image data from the external device.

As shown in FIG. 1, the computer 30 of the image forming apparatus 10 includes a token acquisition unit 15, a token storage unit 16, an e-mail transmission and reception unit 17, and a controller 18 as functional units. In other words, the computer 30 operates as the token acquisition unit 15, the token storage unit 16, the e-mail transmission and reception unit 17, and the controller 18.

The token acquisition unit 15 performs authentication and authorization with the authorization server 21 via the communication device 41 to acquire a token. The authentication performed by the token acquisition unit 15 with the authorization server 21 is XOAUTH authentication. The token acquisition unit 15 requests the authorization server 21 to issue a token with an authorization code.

The authorization server 21 refers to the authorization code and, if it can be confirmed that the token acquisition unit 15 has authority, issues a token. The token includes an access token and a refresh token. The access token is used when the e-mail transmission and reception unit 17 transmits and receives an e-mail to and from the e-mail server 22. The access token includes information such as an expiration date and a connection authority. The expiration date is set to be short in order to improve security. The refresh token is used when the authorization server 21 is requested to reissue the access token.

The token storage unit 16 stores the token acquired by the token acquisition unit 15, that is, the access token and the refresh token, in a storage device 35 to be described later. The token storage unit 16 also responds to the token request by outputting a token in response to the token request from the token acquisition unit 15.

As described above, the image forming apparatus 10 incorporates the computer 30. The token acquisition unit 15 is provided as an application including a program installed in the computer of the image forming apparatus 10. The application of the token acquisition unit 15 is stored in the storage device 35 of the computer 30. A processor (CPU 32 to be described later) of the computer 30 reads the application of the token acquisition unit 15 from the storage device 35 and executes a program of the application, thereby causing the token acquisition unit 15 to acquire a token and causing the token storage unit 16 to store the token.

The e-mail transmission and reception unit 17 transmits and receives an e-mail to and from the e-mail server 22 via the communication device 41. Specifically, the e-mail transmission and reception unit 17 requests an access token from the token acquisition unit 15. The e-mail transmission and reception unit 17 transmits and receives an e-mail to and from the e-mail server 22 via the communication device 41 by using the access token acquired as a response from the token acquisition unit 15.

The e-mail transmission and reception unit 17 stores various settings related to the transmission and reception of an e-mail. The various settings include, for example, e-mail addresses, types of reception servers such as POP3 and IMAP, usernames, passwords, various settings of POP3 reception servers, various settings of IMAP reception servers, various settings of SMTP transmission servers, lists of e-mail addresses of individuals, and e-mail address books of grouped destinations.

The controller 18 controls the entire image forming apparatus 10. Namely, the controller 18 controls the operation panel 11, the image reading device 12, the image forming device 13, and the paper feeding and conveying device 14. Moreover, the controller 18 controls the token acquisition unit 15, the token storage unit 16, and the e-mail transmission and reception unit 17.

FIG. 1 shows the single token acquisition unit 15 and the single authorization server 21 for convenience of explanation. The token acquisition unit 15 is provided for each authorization server 21. Namely, the image forming apparatus 10 may include a plurality of token acquisition units respectively corresponding to a plurality of authorization servers 21. In other words, the applications of the plurality of token acquisition units 15 respectively corresponding to the plurality of authorization servers 21 may be installed in the computer of the image forming apparatus 10.

Hardware Configuration

Figure 2:
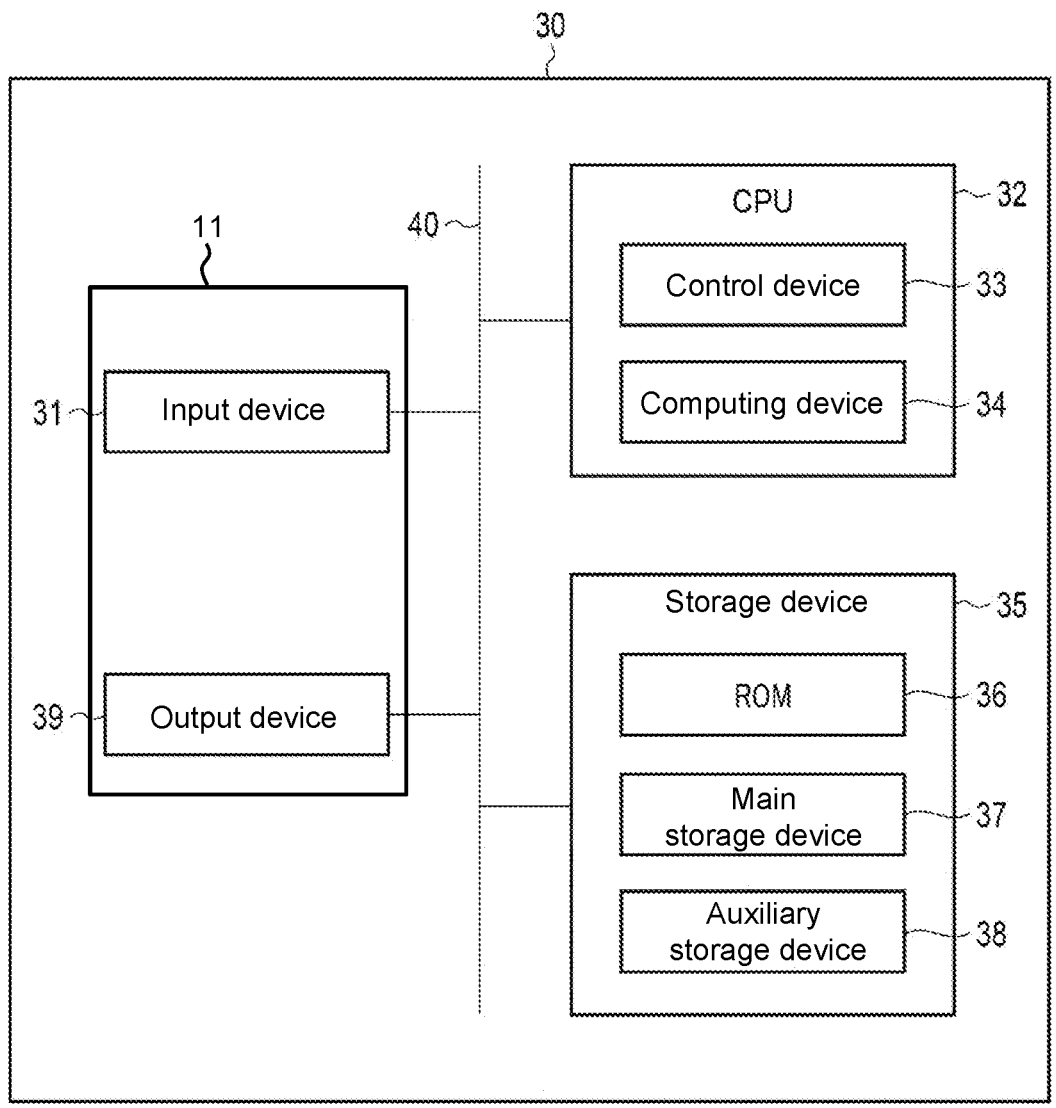
FIG. 2 is a block diagram showing an exemplary hardware configuration of a computer incorporated in the image forming apparatus according to the embodiment.

Next, a hardware configuration of the computer incorporated in the image forming apparatus 10 will be described with reference to FIG. 2. FIG. 2 is a block diagram showing an exemplary hardware configuration of the computer 30 incorporated in the image forming apparatus 10 according to the embodiment.

As shown in FIG. 2, the computer 30 incorporated in the image forming apparatus 10 includes an input device 31, the CPU 32, the storage device 35, and an output device 39. The computer 30 incorporated in the image forming apparatus 10 may further include other peripheral devices in addition to the above devices.

The input device 31, the CPU 32, the storage device 35, and the output device 39 are electrically connected to each other via a bus 40 and exchange data and instructions via the bus 40.

The input device 31 is a device that receives a signal from the outside, converts the signal into data, and passes the data to the CPU 32 and the storage device 35.

The output device 39 is a device that receives data from the CPU 32 and the storage device 35, converts the data into a signal, and outputs the signal.

The storage device 35 stores programs and data necessary for the CPU 32 to execute processing. The CPU 32 performs various types of processing by reading the necessary programs and data from the storage device 35 and executing the programs and data.

The storage device 35 includes a read-only memory (ROM) 36, a main storage device 37, and an auxiliary storage device 38. The main storage device 37 and the auxiliary storage device 38 exchange programs and data with each other.

The ROM 36 stores a program (BIOS) for controlling the CPU 32 at the time of activation.

The main storage device 37 stores programs and data temporarily necessary for the CPU 32 to perform processing. For example, the main storage device 37 is a volatile memory such as a random access memory (RAM).

The auxiliary storage device 38 stores programs and data supplied via an external device or a network, and provides the main storage device 37 with programs and data temporarily necessary for the CPU 32 to perform processing. For example, the auxiliary storage device 38 is a non-volatile memory such as a hard disk drive (HDD) or a solid state drive (SSD).

The CPU 32 is a processor and is hardware that processes data or instructions. The CPU 32 includes a control device 33 and a computing device 34.

The control device 33 controls the input device 31, the computing device 34, the storage device 35, and the output device 39.

The computing device 34 reads programs and data from the main storage device 37, executes the programs to process the data, and provides the processed data to the main storage device 37.

In such a hardware configuration, the input device 31 and the output device 39 are included in the operation panel 11 shown in FIG. 1. Further, the storage device 35 constitutes the token storage unit 16 shown in FIG. 1. Moreover, the CPU 32 and the storage device 35 constitute the token acquisition unit 15, the e-mail transmission and reception unit 17, and the controller 18 shown in FIG. 1.

For example, the CPU 32 reads an application including a program for executing the function of the token acquisition unit 15 from the auxiliary storage device 38 to the main storage device 37, and executes the read program, to thereby perform the operation of the token acquisition unit 15.

The subject that performs an operation is, for example, a computer-related subject such as hardware, a complex of hardware and software, software, and running software. The subject that performs an operation is, but not limited to, for example, a process executed on a processor, a processor, an object, an executable file, a thread, a program, and a computer. For example, the token acquisition unit 15 or an application executed therein may be a subject that executes an operation. A process or thread may be caused to play a plurality of subjects that execute operations. The subject that performs an operation may be in a single token acquisition unit 15 or may be distributed to a plurality of token acquisition units 15.

The functions described above may be recorded in the apparatus in advance, similar functions may be downloaded from a network to the apparatus, or similar functions stored in a recording medium may be installed in the apparatus. The recording medium may have any form such as a disc ROM and a memory card as long as the recording medium can store programs and can be readable by the apparatus. Further, the functions obtained in advance by installing or downloading may be implemented by cooperating with the operating system (OS) or the like inside the apparatus.

Operation Examples

Figure 3:
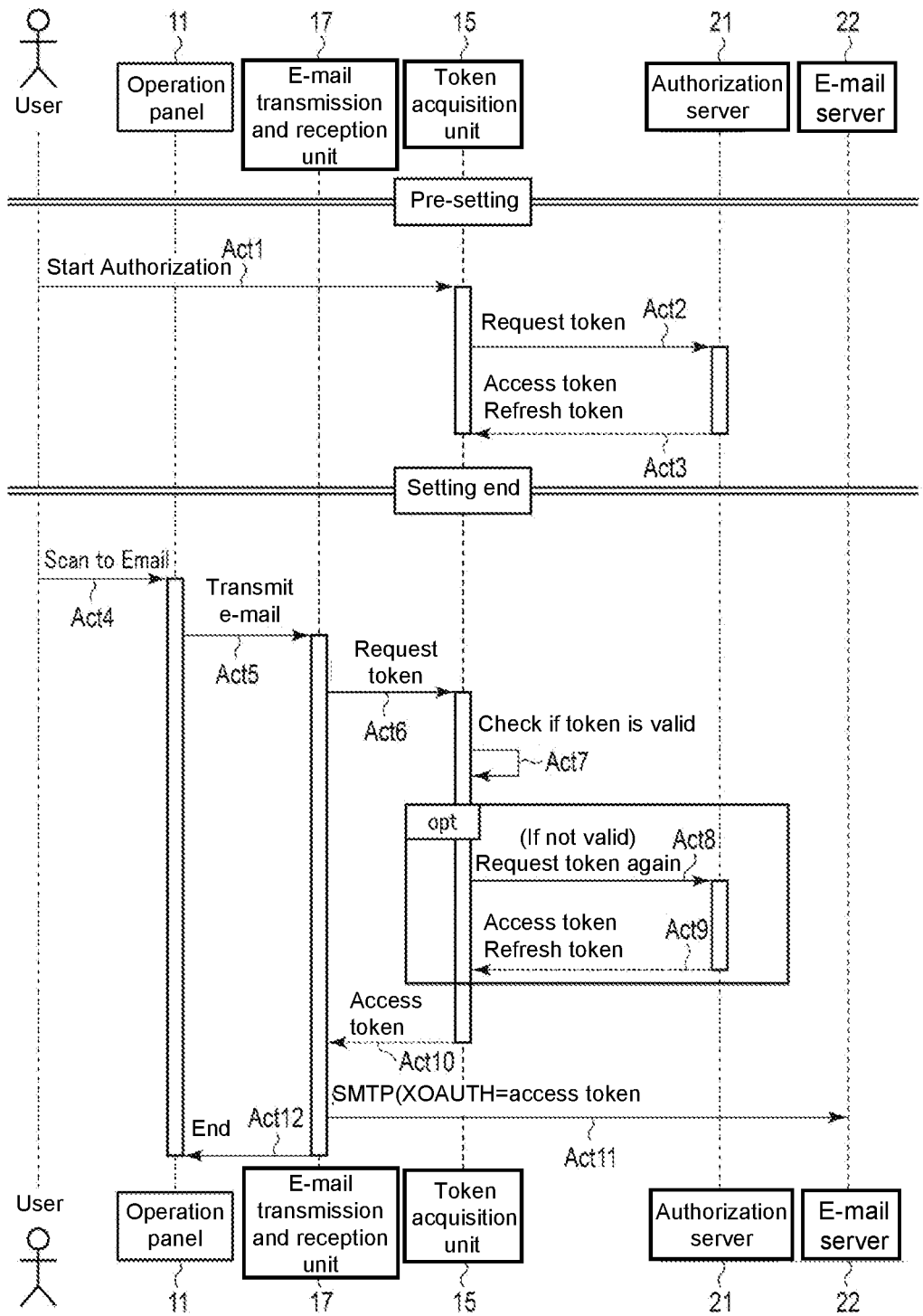
FIG. 3 is a sequence diagram showing an exemplary operation of the image forming apparatus according to the embodiment.

Hereinafter, an operation example of the image forming apparatus 10 will be described with reference to FIG. 3. Here, description will be given on an exemplary "Scan to Email" function of the e-mail transmission and reception unit 17 to transmit the image data of the document read by the image reading device 12. FIG. 3 is a sequence diagram showing the operation of the computer 30 in the "Scan to Email" function. Here, it is assumed that the authentication with and the acquisition of the authorization code from the authorization server 21 are completed. The operation shown in FIG. 3 is performed under the control of the CPU 32 of the computer 30.

First, pre-settings will be described. In Act1 shown in FIG. 3, when the user gives an instruction to start authorization from the operation panel 11, the CPU 32 receives the instruction to start authorization via the operation panel 11. In Act2, the token acquisition unit 15 of the CPU 32 requests the authorization server 21 to issue a token of Oauth2, together with the authorization code.

If the authorization server 21 has confirmed that the token acquisition unit 15 has authority by referring to the authorization code, the authorization server 21 issues a token, that is, an access token and a refresh token. In Act3, the token acquisition unit 15 of the CPU 32 acquires the issued access token and refresh token. The token acquisition unit 15 stores the acquired access token and refresh token in the storage device 35 (token storage unit 16). Thus, the pre-settings are completed.

Next, the operation of the CPU 32 in the "Scan to Email" function will be described. If the user specifies the "Scan to Email" function from the operation panel 11 and inputs an e-mail address of a destination, in Act4 shown in FIG. 3, the CPU 32 receives the instruction of the function and the e-mail address via the operation panel 11. In Act5, the CPU 32 controls the image reading device 12 to read a document and generate image data. The e-mail transmission and reception unit 17 of the CPU 32 starts an operation for transmitting the image data to the e-mail address of the destination.

In Act6, the e-mail transmission and reception unit 17 of the CPU 32 requests the access token from the token acquisition unit 15. In Act7, when receiving a request of the access token, the token acquisition unit 15 of the CPU 32 reads the access token from the storage device 35 (token storage unit 16). The token acquisition unit 15 then checks if the access token is valid on the basis of the expiration date included in the read access token.

If the access token is valid, in Act10, the token acquisition unit 15 of the CPU 32 responds to the e-mail transmission and reception unit 17 by outputting the access token, which is read from the storage device 35 (token storage unit 16), to the e-mail transmission and reception unit 17 as it is.

If the access token is not valid, in Act8, the token acquisition unit 15 of the CPU 32 reads the refresh token from the storage device 35 (token storage unit 16).

The token acquisition unit 15 transmits the read refresh token to the authorization server 21, and requests the authorization server 21 to reissue the token, that is, the access token and the refresh token. If the authorization server 21 reissues the token, that is, the access token and the refresh token, in Act9, the token acquisition unit 15 of the CPU 32 acquires the reissued access token and refresh token.

In Act10, the token acquisition unit 15 of the CPU 32 stores the acquired, reissued access token and refresh token in the storage device 35 (token storage unit 16). Further, the token acquisition unit 15 responds to the e-mail transmission and reception unit 17 by outputting the reissued access token to the e-mail transmission and reception unit 17.

In Act11, when receiving the access token from the token acquisition unit 15, the e-mail transmission and reception unit 17 of the CPU 32 transmits an e-mail, to which the image data is attached, to the e-mail server 22 (SMTP server) together with the access token.

In Act12, the CPU 32 controls the operation panel 11 to indicate that the e-mail transmission and reception unit 17 has completed the transmission of the e-mail.

In the above description of the operation, the example in which the e-mail transmission and reception unit 17 of the CPU 32 transmits the e-mail has been described, but if the e-mail transmission and reception unit 17 receives the e-mail, the operation is similarly performed except for the difference between transmission and reception.

As described above, in the image forming apparatus according to the embodiment, the token acquisition unit 15, which is an application installed in the image forming apparatus 10, takes charge of XOAUTH authentication. This makes it possible to support XOAUTH authentication while using various settings related to the transmission and reception of e-mails stored in the e-mail transmission and reception unit 17 as they are.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus capable of communicating externally, comprising:
   an image forming device;
   an image reading device;
   a communication device communicable with an external authorization server and a mail server;
   an operation panel that generates an instruction to start a scan to e-mail operation upon a user operation thereof;

a storage device that stores a token that is issued by the external authorization server and required to communicate with the mail server;

a memory that stores an application program for acquiring the token and transmitting and receiving an e-mail; and a processor configured to, by executing the application program stored in the memory, perform authentication and authorization with the external authorization server to acquire the token issued by the external authorization server, store the acquired token in the storage device, and upon the instruction to start the scan to e-mail operation being generated by the operation panel, cause the image reading device to start reading of an image from an original set on the image forming device and generate image data of the read image, acquire the token stored in the storage device and verify validity of the acquired token, and upon validity of the acquired token being verified, cause the communication device to transmit an e-mail along with the image data and the acquired token of which validity has been verified to the mail server.

2. The image forming apparatus according to claim 1, wherein the processor is configured to perform XOAUTH authentication as the authentication performed with the external authorization server.

3. The image forming apparatus according to claim 1, wherein the token includes an access token to be used in transmitting and receiving e-mails to and from the mail server, the access token being expirable, and a refresh token to be used in requesting the external authorization server to reissue the access token.

4. The image forming apparatus according to claim 3, wherein the token of which validity is verified by the processor is the access token.

5. The image forming apparatus according to claim 4, wherein the processor is configured to upon validity of the acquired token being not verified, acquire the refresh token included in the token stored in the storage device from the storage device, transmit the acquired refresh token to the external authorization server, and request the external authorization server to reissue the access token and the refresh token.

6. The image forming apparatus according to claim 5, wherein the processor is configured to acquire the reissued access token and the reissued refresh token, and cause the storage device to store the reissued access token and the reissued refresh token.

7. The image forming apparatus according to claim 6, wherein the processor is configured to transmit the e-mail along with the image data and the reissued access token to the mail server.

8. A mail transmission and reception control method for an image forming apparatus capable of communicating externally, the method comprising:

performing authentication and authorization with an external authorization server to acquire a token that is issued by the authorization server and required to communicate with a mail server;

storing the acquired token in a storage device;

upon an instruction to start a scan to e-mail operation being generated by an operation panel of the image forming apparatus, causing an image reading device of the image forming apparatus to start reading of an image from an original set on the image forming device and generate image data of the read image;

acquiring the token stored in the storage device and verifying validity of the acquired token; and upon validity of the acquired token being verified, causing a communication device of the image forming apparatus to transmit an e-mail along with the image data and the acquired token of which validity has been verified, to the mail server.

* * * * *